(12) United States Patent
Maes (10) Patent No.: US 8,095,688 B2
(45) Date of Patent: Jan. 10, 2012

(54) STAGING LATENCY PERFORMANCES AND ORCHESTRATING NETWORK RESOURCES WITH LOW LATENCY REQUIREMENTS

(75) Inventor: Stephane H. Maes, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1039 days.

(21) Appl. No.: 11/670,150

(22) Filed: Feb. 1, 2007

(65) Prior Publication Data

US 2008/0186845 A1    Aug. 7, 2008

(51) Int. Cl.
*G06F 15/16* (2006.01)
(52) U.S. Cl. ........................................ 709/250; 709/227
(58) Field of Classification Search .................. 709/250, 709/227
See application file for complete search history.

(56) References Cited

U.S. PATENT DOCUMENTS

| | | | |
|---|---|---|---|
| 7,023,800 B1 * | 4/2006 | McAuley et al. | 370/235 |
| 7,870,265 B2 * | 1/2011 | Kramer et al. | 709/227 |
| 2005/0021670 A1 * | 1/2005 | Maes | 709/217 |
| 2007/0204017 A1 * | 8/2007 | Maes | 709/223 |
| 2007/0268922 A1 * | 11/2007 | Dougan et al. | 370/401 |
| 2008/0077705 A1 * | 3/2008 | Li et al. | 709/236 |
| 2008/0120599 A1 * | 5/2008 | I'Anson | 717/120 |
| 2011/0131318 A1 | 6/2011 | Maes | |

OTHER PUBLICATIONS

Lim et al., Jain SLEE 1.0 Specification, Jan. 30, 2004, https://cds.sun.com/is-bin/Intershop.enfinity/WFS/CDS-CDS_JCP-Site/en_US/-/USD/ViewFilteredProducts-SimpleBundleDownload.*
Sun, The Jain APIs: Integrated Network APIs for the Java Platform, Jan. 2002.*
Sun, Jain and Open Networks, Aug. 2003.*
Bossche et al., J2EE-based Middleware for Low Latency Service Enabling Platforms, Dec. 1, 2006.*
Sun, A SLEE for all Seasons, Mar. 4, 2003.*
Sun, Jain and Java in Communications, Mar. 2004.*
Sun, Jain Technology: Serving the Developer Community, Jul. 28, 2004, http://web.archive.org/web/20040728172200/http://java.sun.com/products/jain/jain0503.pdf.*
Open Mobile Alliance, OMA Service Environment, Mar. 8, 2005.*

* cited by examiner

*Primary Examiner* — Joseph Avellino
*Assistant Examiner* — James Conaway
(74) *Attorney, Agent, or Firm* — Kilpatrick Townsend & Stockton LLP (57) ABSTRACT

Methods, systems, and machine-readable media are disclosed for orchestrating behavior of network resources while reducing latency. According to one embodiment, a system can comprise a first network resource communicatively coupled with a communications network. The first network resource can have predictable latencies and can be adapted to handle network signaling and transport processes. A first enabler introducing greater latencies than the first network resource can be communicatively coupled with the first network resource and can be adapted to control the first network resource. The system may also include an adapter introducing greater latencies than the first network resource and lower latencies than the first enabler and adapted to react to network events and signaling of the communications network not handled by the network resource. An orchestrator can be communicatively coupled with the first enabler and adapted to orchestrate behavior of the first network resource via the first enabler.

27 Claims, 9 Drawing Sheets

STAGING LATENCY PERFORMANCES AND ORCHESTRATING NETWORK RESOURCES WITH LOW LATENCY REQUIREMENTS

BACKGROUND OF THE INVENTION

Embodiments of the present invention generally relate to electronic communications in a network. More specifically, embodiments of the present invention relate to orchestrating behavior of network resources while reducing latency in handling network events.

Components and endpoints of a communications network can interact with one another in various ways which, in some casers, can be orchestrated by a set of rules or other predefined processes. That is, an operator of a communication network, such as a telephone company or other service provider, can define a set of processes to be performed upon the occurrence of some network event, such as a user placing a call or otherwise initiating a communication. For example, a set of one or more processes can be predefined in a language such as Business Process Execution Language (BPEL). These predefined processes can define actions to be taken upon the occurrence of some event or exchange between components of the systems.

However, orchestrating the behaviors of the components of a communications network can introduce latencies that may be unacceptable to the end users. That is, processing delays or latencies introduced by performing the orchestration may result in a degradation of the quality of service provided to the users of the network. Hence, there is a need in the art for improved methods and systems for orchestrating behavior of network resources while reducing latency in handling network events.

BRIEF SUMMARY OF THE INVENTION

Methods, systems, and machine-readable media are disclosed for orchestrating behavior of network resources while reducing latency in handling network events. According to one embodiment, a system can comprise a communications network and a first network resource communicatively coupled with the communications network. The first network resource can comprise components having predictable latencies and can be adapted to handle network signaling and transport processes. A first enabler can be communicatively coupled with the first network resource. The first enabler can comprise components introducing greater latencies than the components of the first network resource and can be adapted to control the first network resource.

In some cases, the system can also include an adapter communicatively coupled with the first network resource and the first enabler. The adapter can comprise components introducing greater latencies than components of the first network resource and lower latencies than components of the first enabler and can be adapted to react to network events and signaling of the communications network not handled by the network resource. The system may also include an orchestrator communicatively coupled with the first enabler. The orchestrator can be adapted to orchestrate behavior of the first network resource via the first enabler. The orchestrator can be adapted to apply orchestration to the first enabler by performing one or more processes. For example, the one or more processes are defined in Business Process Execution Language (BPEL).

So, for example, the first network resource can be adapted to detect a first network event and handle network signaling and transport processes related to the first network event. The first network enabler can be adapted to control the first network resource based on the first network event and the orchestrator can be adapted to orchestrate behavior of the first network resource by applying orchestration to the first enabler based on the first network event. In another example, the first enabler can be adapted to initiate a network action and control the first network resource according to the network action and the network resource can be adapted to perform network signaling and transport processes according to the network action. The orchestrator can be adapted to orchestrate the behavior of the first network resource by applying orchestration to the first enabler based on the network action. In some cases, the first network enabler can be adapted to initiate the network action in response to orchestration performed by the orchestrator.

The system may also include a second network resource communicatively coupled with the communications network. The second network resource can comprise components having predictable latencies and can be adapted to handle network signaling and transport processes. A second enabler can be communicatively coupled with the second network resource. The second enabler can comprise components introducing greater latencies than the components of the second network resource and can be adapted to control the second network resource. The orchestrator can be communicatively coupled with the second enabler and can be adapted to orchestrate behavior of the second network resource via the second enabler. The orchestrator is adapted to apply orchestration to the second enabler by performing one or more processes based on the second network event. For example, the one or more processes are defined in BPEL. In some cases, the orchestrator can be further adapted to orchestrate interactions between the first enabler and the second enabler.

According to another embodiment, a method for orchestrating behavior of network resources while reducing latency in handling network events can comprise detecting a network event or action. Network signaling and transport processes related to the network event or action can be handled with a first network resource having components with predictable latencies. The first network resource can be controlled with a first enabler having components with greater latencies than the components of the first network resource. In some cases, the method can also include reacting to network events and signaling not handled by the network resource with an adapter having components with greater latencies than components of the first network resource and lower latencies than components of the first enabler. Behavior of the first network resource may be orchestrated via the first enabler. Orchestrating behavior of the first network resource via the first enabler can comprise performing one or more processes. For example, the one or more processes can be defined in Business Process Execution Language (BPEL).

In some cases, detecting the network event or action can be performed by the network resource. In such a case, the first network enabler can control the first network resource based on the first network event and the orchestrator can orchestrate behavior of the first network resource based on the first network event. In other cases, the network event or action can be initiated by the first enabler. In such cases, the first enabler can control the first network resource according to the network action and the network resource can perform network signaling and transport processes according to the network action. The orchestrator can orchestrate the behavior of the first network resource based on the network action. In some cases, the first network enabler can initiate the network action in response to orchestration performed by the orchestrator.

According to yet another embodiment, a machine-readable medium can have stored thereon a series of instructions which, when executed by a processor, cause the processor to orchestrate behavior of network resources while reducing latency in handling network events by detecting a network event or action. Network signaling and transport processes related to the network event or action can be handled with a first network resource having components with predictable latencies. The first network resource can be controlled with a first enabler having components with greater latencies than the components of the first network resource. In some cases, the method can also include reacting to network events and signaling not handled by the network resource with an adapter having components with greater latencies than components of the first network resource and lower latencies than components of the first enabler. Behavior of the first network resource may be orchestrated via the first enabler. Orchestrating behavior of the first network resource via the first enabler can comprise performing one or more processes. For example, the one or more processes can be defined in Business Process Execution Language (BPEL).

In some cases, detecting the network event or action can be performed by the network resource. In such a case, the first network enabler can control the first network resource based on the first network event and the orchestrator can orchestrate behavior of the first network resource based on the first network event. In other cases, the network event or action can be initiated by the first enabler. In such cases, the first enabler can control the first network resource according to the network action and the network resource can perform network signaling and transport processes according to the network action. The orchestrator can orchestrate the behavior of the first network resource based on the network action. In some cases, the first network enabler can initiate the network action in response to orchestration performed by the orchestrator.

DETAILED DESCRIPTION OF THE INVENTION

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

Generally speaking, embodiments of the present invention relate to orchestrating behavior of network resources while reducing latency in handling network events. Embodiments of the present invention provide for staging or layering of latencies by performing orchestration at a level above the network components. That is, the network events are handled by the high-performance network components to reduce the latencies apparent to the end users. An enabler is provided for each network component that can control the behavior of that component. Orchestration of the component is performed through the enabler rather than directly on the network component. Thus, the high-performance network components are able to handle the network events without incurring latencies introduced by the orchestration while orchestration of the actions and interactions of the components can be orchestrated via the enablers of each component.

It should be noted that embodiments of the present invention may be implemented in any of a wide variety of networks used for different types of electronic communications. For example, while embodiments of the present invention may be useful in orchestrating components of a network used to provide telephone services, various other embodiments are not limited to implementations in such networks. In other examples, embodiments of the present invention may be implemented in a network that additionally or alternatively provides television and/or other multimedia services, messaging and other real-time communication aspects. It should also be noted that, while discussed herein with reference to Business Process Execution Language (BPEL), embodiments of the present invention may be implemented with other types of languages for defining processes and performing orchestration of components, workflows, etc.

Figure 1:
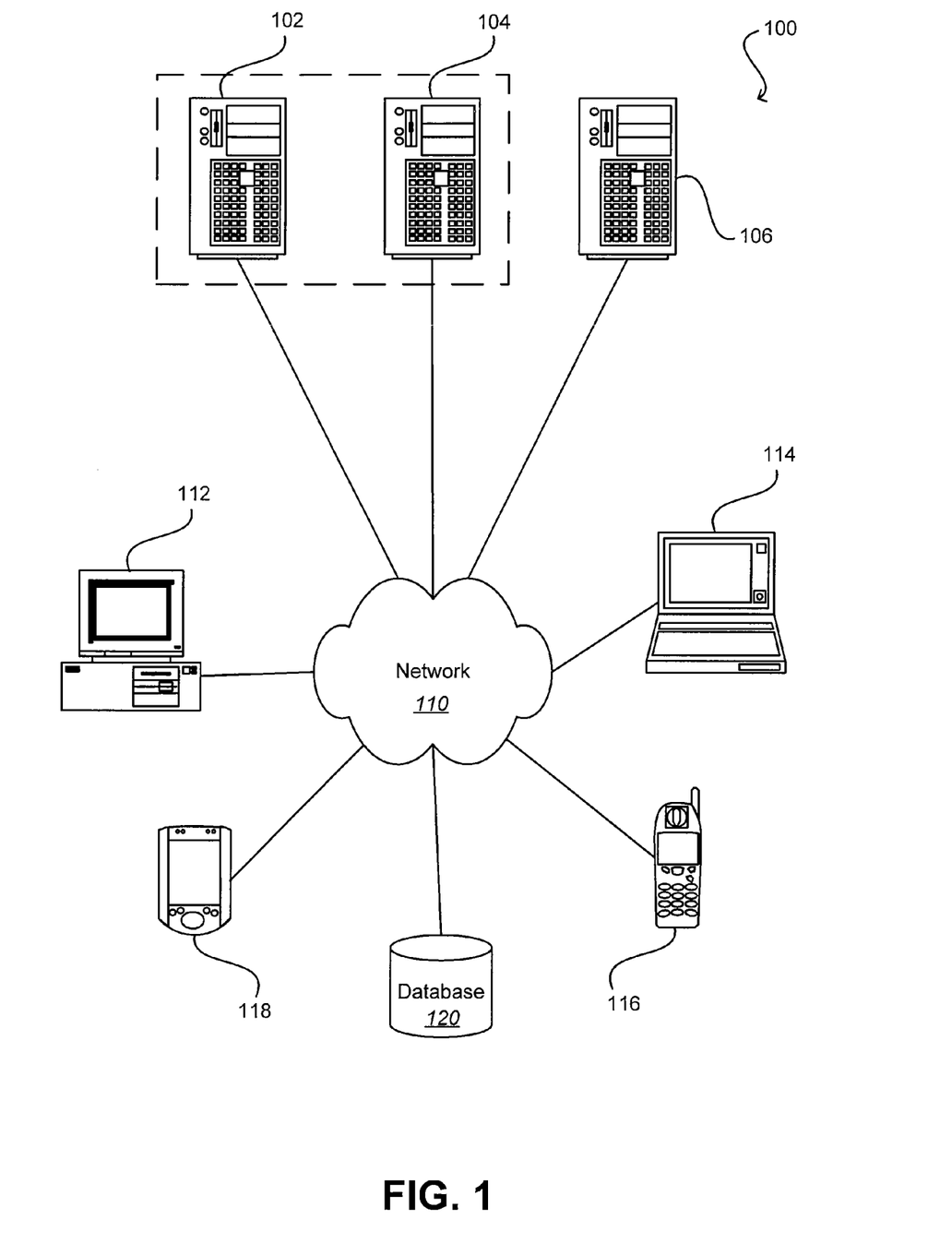
FIG. 1 is a block diagram illustrating an exemplary environment in which various embodiments of the present invention may be implemented.

FIG. 1 is a block diagram illustrating an exemplary environment in which various embodiments of the present invention may be implemented. The system 100 can include one or more user computers, computing devices, or processing devices 112, 114, 116, 118, which can be used to operate a client, such as a dedicated application, web browser, etc. The user computers 112, 114, 116, 118 can be general purpose personal computers (including, merely by way of example, personal computers and/or laptop computers running various versions of Microsoft Windows and/or Apple Macintosh operating systems), cell phones or PDAs (running software such as Microsoft Windows Mobile and being Internet, e-mail, SMS, Blackberry, or other communication protocol enabled), and/or workstation computers running any of a variety of commercially-available UNIX or UNIX-like operating systems (including without limitation, the variety of GNU/Linux operating systems). These user computers 112, 114, 116, 118 may also have any of a variety of applications, including one or more development systems, database client and/or server applications, and Web browser applications. Alternatively, the user computers 112, 114, 116, 118 may be any other electronic device, such as a thin-client computer, Internet-enabled gaming system, and/or personal messaging device, capable of communicating via a network (e.g., the network 110 described below) and/or displaying and navigating Web pages or other types of electronic documents. Although the exemplary system 100 is shown with four user computers, any number of user computers may be supported.

The system 100 can also include a communications network 110. The network may can be any type of network familiar to those skilled in the art that can support data communications using any of a variety of commercially-available protocols, including without limitation TCP/IP, SNA, IPX, AppleTalk, and the like. Merely by way of example, the network 110 can be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks.

The system may also include one or more server computers 102, 104, 106 which can be general purpose computers, specialized server computers (including, merely by way of example, PC servers, UNIX servers, mid-range servers, mainframe computers rack-mounted servers, etc.), server farms, server clusters, or any other appropriate arrangement and/or combination. One or more of the servers (e.g., 106) may be dedicated to running applications, such as a business application, a Web server, application server, etc. Such servers may be used to process requests from user computers 112, 114, 116, 118. The applications can also include any number of applications for controlling access to resources of the servers 102, 104, 106.

The Web server can be running an operating system including any of those discussed above, as well as any commercially-available server operating systems. The Web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 112, 114, 116, 118. As one example, a server may execute one or more Web applications. The Web application may be implemented as one or more scripts or programs written in any programming language, such as Java, C, C# or C++, and/or any scripting language, such as Perl, Python, or TCL, as well as combinations of any programming/scripting languages. The server(s) may also include database servers, including without limitation those commercially available from Oracle, Microsoft, Sybase, IBM and the like, which can process requests from database clients running on a user computer 112, 114, 116, 118.

The system 100 may also include one or more databases 120. The database(s) 120 may reside in a variety of locations. By way of example, a database 120 may reside on a storage medium local to (and/or resident in) one or more of the computers 102, 104, 106, 112, 114, 116, 118. Alternatively, it may be remote from any or all of the computers 102, 104, 106, 112, 114, 116, 118, and/or in communication (e.g., via the network 110) with one or more of these. In a particular set of embodiments, the database 120 may reside in a storage-area network ("SAN") familiar to those skilled in the art. Similarly, any necessary files for performing the functions attributed to the computers 102, 104, 106, 112, 114, 116, 118 may be stored locally on the respective computer and/or remotely, as appropriate. In one set of embodiments, the database 120 may be a relational database, such as Oracle 10g, that is adapted to store, update, and retrieve data in response to SQL-formatted commands.

Figure 2:
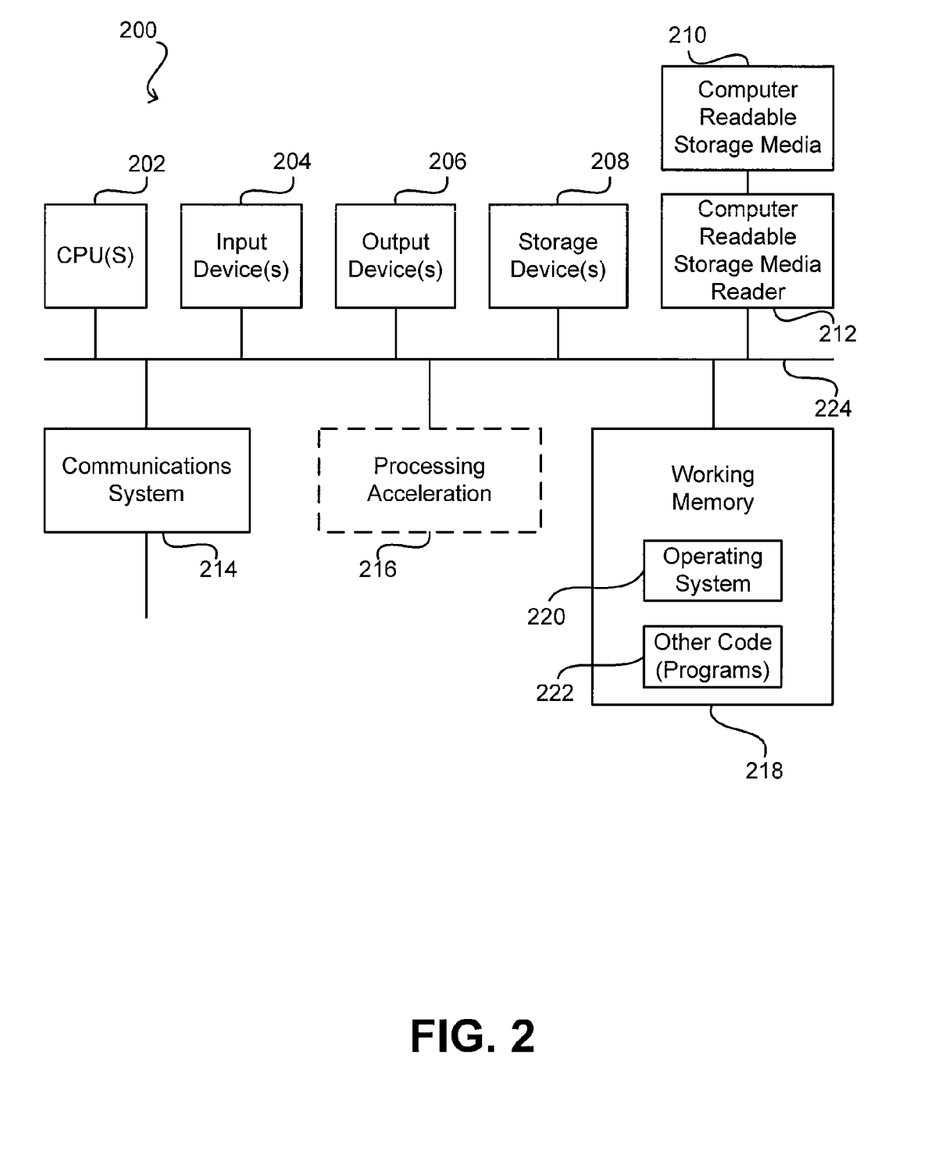
FIG. 2 is a block diagram illustrating an exemplary computer system upon which embodiments of the present invention may be implemented.

FIG. 2 is a block diagram illustrating an exemplary computer system upon which embodiments of the present invention may be implemented. The system 200 may be used to implement any of the computer systems described above. For example, one or more systems such as system 200 may be used to implement a server, user computer, and/or any other of the systems or components described above.

The computer system 200 is shown comprising hardware elements that may be electrically coupled via a bus 224. The hardware elements may include one or more central processing units (CPUs) 202, one or more input devices 204 (e.g., a mouse, a keyboard, etc.), and one or more output devices 206 (e.g., a display device, a printer, etc.). The computer system 200 may also include one or more storage devices 208. By way of example, the storage device(s) 208 can include devices such as disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 212, a communications system 214 (e.g., a modem, a network card (wireless or wired), an infra-red communication device, etc.), and working memory 218, which may include RAM and ROM devices as described above. In some embodiments, the computer system 200 may also include a processing acceleration unit 216, which can include a digital signal processor DSP, a special-purpose processor, and/or the like.

The computer-readable storage media reader 212 can further be connected to a computer-readable storage medium 210, together (and, optionally, in combination with storage device(s) 208) comprehensively representing remote, local, fixed, and/or removable storage devices plus storage media for temporarily and/or more permanently containing computer-readable information. The communications system 214 may permit data to be exchanged with the network and/or any other computer described above with respect to the system 200.

The computer system 200 may also comprise software elements, shown as being currently located within a working memory 218, including an operating system 220 and/or other code 222, such as an application program (which may be a client application, Web browser, mid-tier application, RDBMS, etc.). It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

Software stored on and/or executed by system 200 can include instructions for orchestrating behavior of network resources while reducing latency in handling network events. As noted above and as will be described further below, embodiments of the present invention provide for staging of latencies by performing orchestration at a level above the network components. That is, the network events are handled by the high-performance network components to reduce the latencies apparent to the end users. An enabler is provided for each network component that can control the behavior of that component. Orchestration of the component is performed through the enabler rather than directly on the network component. Thus, the high-performance network components are able to handle the network events without incurring latencies introduced by the orchestration while orchestration of the actions and interactions of the components can be orchestrated via the enablers of each component.

Figure 3:
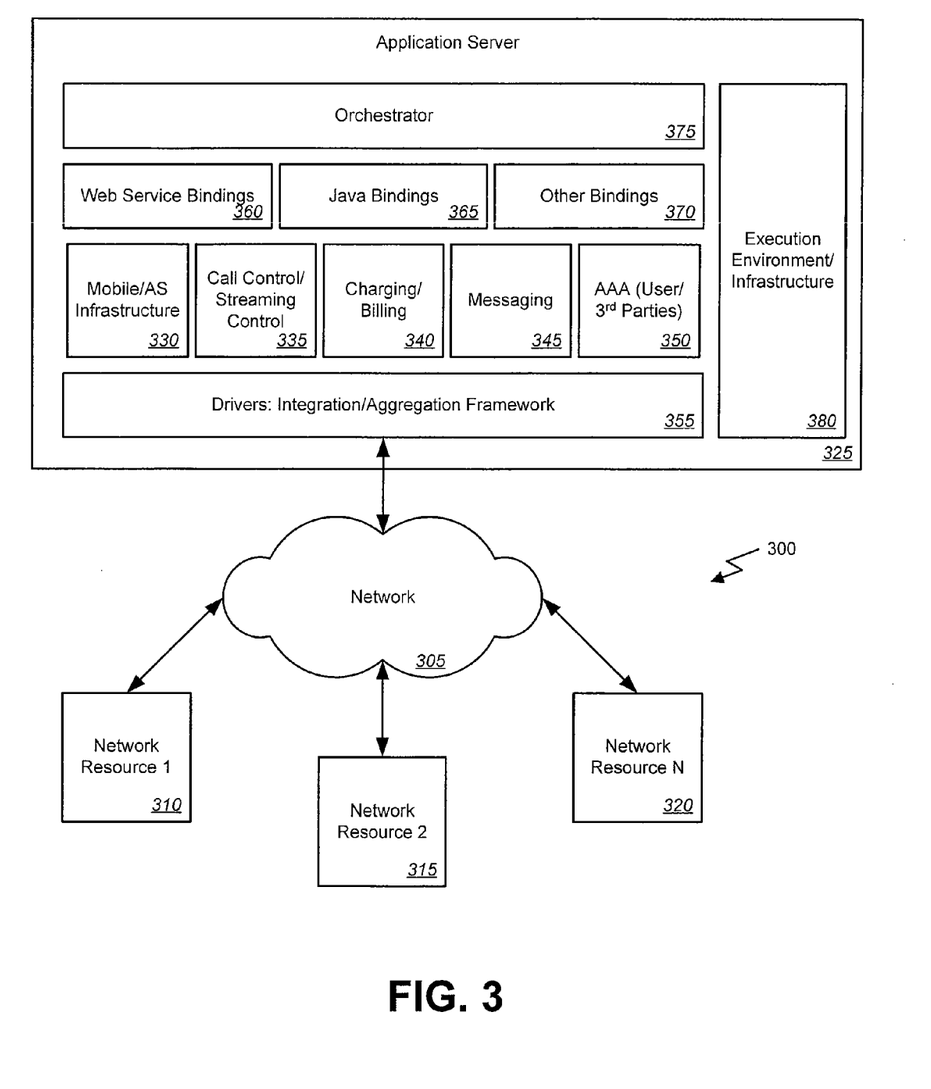
FIG. 3 is a block diagram illustrating functional components of a system for orchestrating behavior of network resources while reducing latency in handling network events according to one embodiment of the present invention.

FIG. 3 is a block diagram illustrating functional components of a system for orchestrating behavior of network resources while reducing latency in handling network events according to one embodiment of the present invention. In this example, the system 300 includes a communications network 305 such as the Internet or another network as described above. The system can also include a number of network resources 310-320. For example, the network resources can include any of a number of client or end devices as described above, application servers, media servers, or any other component of a communication network.

Generally speaking, as will be seen, in a system according to one embodiment of the present invention network resources can be abstracted via enablers. These enablers can in turn be orchestrated, i.e., orchestration can be applied to the enablers. Enablers, in the example of a communications network, can be any reusable piece of code that expose a useful voice, communication, or mobile function. Furthermore, the enabler can be built so that they exploit the real-time capabilities of the network resources to which they relate. Additionally, the enablers can be pre-programmed to expose to other enablers or applications a north-bound interface that is less latency sensitive. Orchestration can be done on these interfaces.

The system 300 includes an application server 325 that can be adapted to communicate with the network resources 310-320 via the network 305. The application server 325 can include a number of enablers 330-350 adapted to communicate with the network resources 310-320, perhaps via one or more drivers 325, and the network 305. Generally speaking, the enablers 330-350 provide for detecting and handling various network events and/or communications with the network resources 310-320 or to initiate a network action. For example, a mobile enabler can provide for handling communications with a mobile network resource such as a cell phone or other mobile device. Additionally or alternatively, a call control and/or streaming control enabler can provide for handling communications to and/or from a network resource in the form of a call or other streaming communications. Other enablers 340-350 can be provided to perform of other functions and handle other types of network events. It should be noted that the number and types of enablers 330-350 used can vary widely depending upon the exact implementation, i.e., the types of network resources 310-320 and the events to be handled.

The application server 3256 can also include an orchestrator 375 communicatively coupled with the enablers 330-350. As used herein, the term orchestrator is used to refer to any orhestrator and/or Service Oriented Architecture (SOA) processor or composer. For example, the orchestrator 375 can comprise a policy enforcer, a set of workflows, etc. that define a set of conditions and related actions. The orchestrator 375 may be coupled with the enablers 330-350 via one or more bindings 360-370. For example, the bindings may include web service bindings 360, Java bindings 365, and/or other types of bindings 370 that provide an interface between the enablers 330-350 and the orchestrator 375.

Generally speaking the orchestrator 375 can be adapted to provide orchestration of behavior of the network resources 310-320 via the enablers 330-350. More specifically, the orchestrator can apply a set of rules and/or perform a set of predefined processes for a particular network event. For example, the rules and/or processes can be defined in BPEL or another high-level language can define actions or behaviors for the network resources on the occurrence of an event or condition. In this way, the orchestrator 375 can control or orchestrate behaviors of the network resources 310-320 via the enablers 330-350.

The various elements of the application server, such as the drivers 325, enablers, 330-350, bindings 360-370, and orchestrator 375 can execute on and be managed by an execution environment 380 of the application server 325. For example, the execution environment may include any of the operating systems or environments discussed above.

Thus, embodiments of the present invention provide for staging of latencies by performing orchestration at a level above the network components. That is, the network events are handled by the high-performance, low latency network components to reduce the latencies apparent to the end users. An enabler 330-350 is provided for each network component that can control the behavior of that component. Orchestration of the component is performed by the orchestrator 375 through the enabler 330-350 rather than directly on the network component. Thus, the high-performance network components are able to handle the network events without incurring latencies introduced by the orchestration while orchestration of the actions and interactions of the components can be orchestrated via the enablers of each component.

Figure 4:
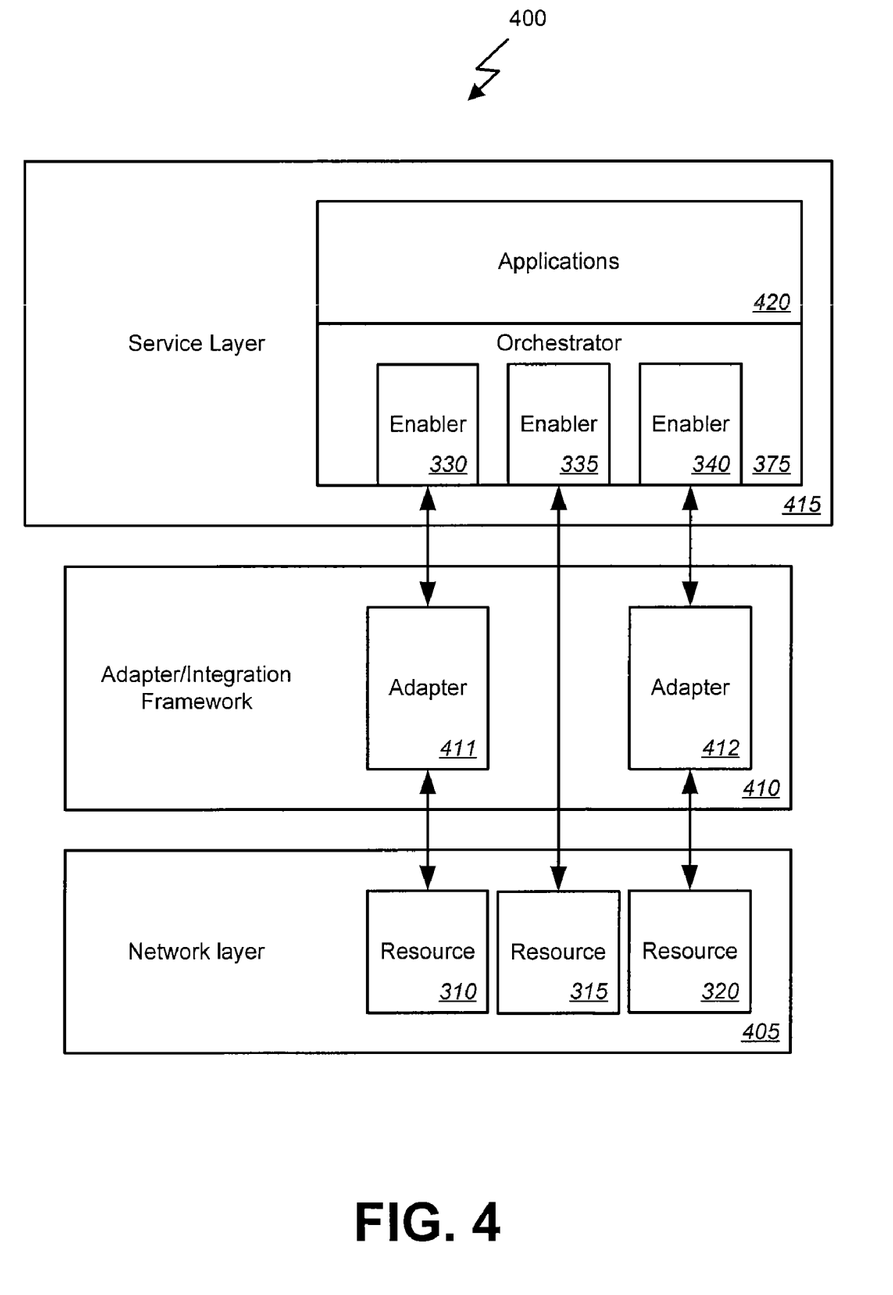
FIG. 4 is a block diagram illustrating additional details of an interface between an application and a network resource in a system for orchestrating behavior of network resources while reducing latency in handling network events according to one embodiment of the present invention.

FIG. 4 is a block diagram illustrating additional details of an interface between an application and a network resource in a system for orchestrating behavior of network resources while reducing latency in handling network events according to one embodiment of the present invention. In this example, components of the system 400 are conceptually or logically divided into a number of layers including a network layer 405. The network layer 405 can include the network resources 310-320 and the network (not shown here) as discussed above.

The system can also include an adapter/integration framework 410. The adapter/integration framework 410, represented in FIG. 3 as drivers 355, can include a number of adapters 411 and 412. Generally speaking the adapters 411 and 412 or drivers of the adapter/integration framework 410 can provide an interface to the resources 310-320 of the network layer 405. However, it should be noted that, in some cases, not all resources 310-320 may require or utilize an adapter. Rather, such resources 315 can be accessed directly from the service layer 415. The adapter/integration framework 410 may be implemented by an application server as described above or elsewhere.

The system 400 can also include a service layer 415 that may be implemented by the application server. The service layer 415 can include a number of enablers 330-340 adapted to detect and handle network events generated by or related to the network resources 310-320 of the network layer 405. The service layer can also include an orchestrator 375. As noted above, the orchestrator 375 can be adapted to provide orchestration of behavior of the network resources 310-320 via the enablers 330-350. More specifically, the orchestrator 375 can apply a set of rules and/or perform a set of predefined processes for a particular network event. For example, the rules and/or processes can be defined in BPEL or another high-level language can define actions or behaviors for the network resources on the occurrence of an event or condition. In this way, the orchestrator 375 can control or orchestrate behaviors of the network resources 310-320 via the enablers 330-350.

The service layer can also include a number of applications 420. The applications can include any of a number of possible applications for interacting or communicating with or handling communication between the network resources 310-320. That is, based on the orchestration of the network resources 310-320 provided by the orchestrator 375 via the enablers 330-340, the applications can access the network resources 310-320 or information exchange between network resources 310-320.

Stated another way, the system 400 can comprise a communications network (not shown here) and a first network resource 310 communicatively coupled with the communications network. The first network resource 310 can comprise components having predictable, low latencies and can be adapted to handle network signaling and transport processes. For example, the network resources and adapters may be able to perform a variety of delegated network level actions pre-programmed and/or delegated to it before passing the events or actions to the upper layers. It should be noted that such pre-programming or delegating is not required and may not even be desirable in some cases. A first enabler 330 can be communicatively coupled with the first network resource 310. The first enabler 330 can comprise components introducing greater latencies than the components of the first network resource 310 and can be adapted to control the first network resource 310.

In some cases, the system 300 can also include an adapter 411 communicatively coupled with the first network resource 310 and the first enabler 330. The adapter 411 can comprise components introducing greater latencies than components of the first network resource 310 and lower latencies than components of the first enabler 330 and can be adapted to react to network events and signaling of the communications network not handled by the network resource 310. The system 300 may also include an orchestrator communicatively 375 coupled with the first enabler 330. The orchestrator 375 can be adapted to orchestrate behavior of the first network resource 310 via the first enabler 330. The orchestrator 375 can be adapted to apply orchestration to the first enabler 330 by performing one or more processes. For example, the one or more processes are defined in Business Process Execution Language (BPEL).

So, for example, the first network resource 310 can be adapted to detect a first network event and handle network signaling and transport processes related to the first network event. The first network enabler 330 can be adapted to control the first network resource 310 based on the first network event and the orchestrator 375 can be adapted to orchestrate behavior of the first network resource 310 by applying orchestration to the first enabler 330 based on the first network event. In another example, the first enabler 330 can be adapted to initiate a network action and control the first network resource 310 according to the network action and the network resource 310 can be adapted to perform network signaling and transport processes according to the network action. The orchestrator 375 can be adapted to orchestrate the behavior of the first network resource 310 by applying orchestration to the first enabler 330 based on the network action. In some cases, the first network enabler 330 can be adapted to initiate the network action in response to orchestration performed by the orchestrator 375.

The system may also include a second network resource 320 communicatively coupled with the communications network. The second network resource 320 can comprise components having predictable latencies and can be adapted to handle network signaling and transport processes. A second enabler 340 can be communicatively coupled with the second network resource 320. The second enabler 340 can comprise components introducing greater latencies than the components of the second network resource 320 and can be adapted to control the second network resource 320. The orchestrator 375 can be communicatively coupled with the second enabler 340 and can be adapted to orchestrate behavior of the second network resource 320 via the second enabler 340. The orchestrator 375 can be adapted to apply orchestration to the second enabler 340 by performing one or more processes based on the second network event. For example, the one or more processes are defined in BPEL. In some cases, the orchestrator 375 can be further adapted to orchestrate interactions between the first enabler 330 and the second enabler 340.

Figure 5:
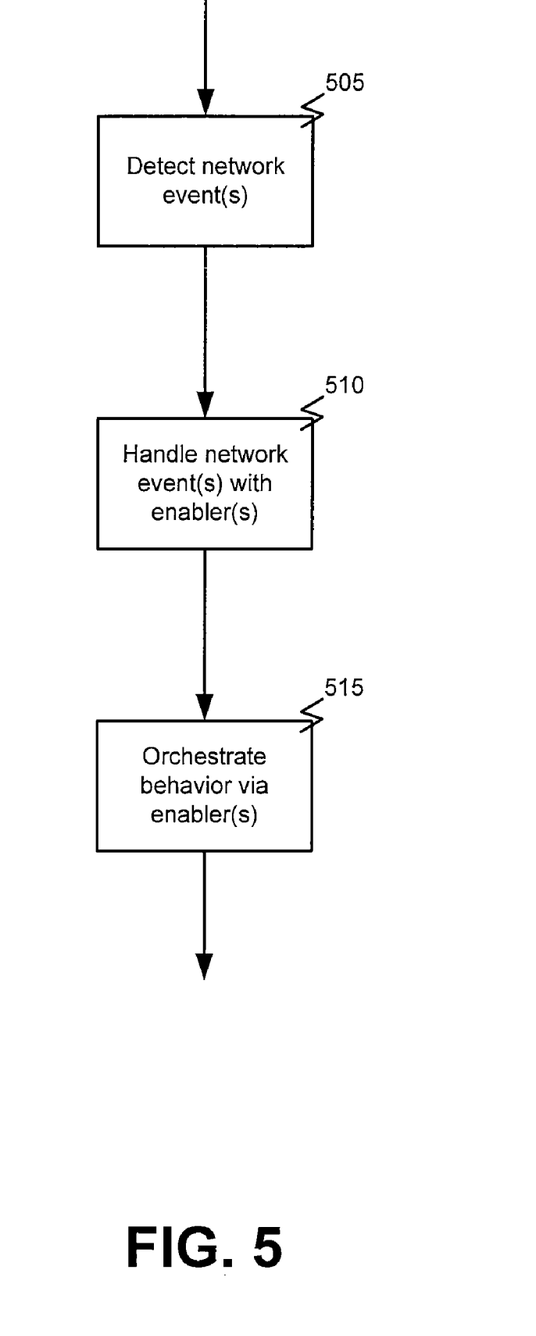
FIG. 5 is a flowchart illustrating a process for orchestrating behavior of network resources while reducing latency in handling network events according to one embodiment of the present invention.

FIG. 5 is a flowchart illustrating a process for orchestrating behavior of network resources while reducing latency in handling network events according to one embodiment of the present invention. In this example, processing begins with detecting 505 a first network event related to a first network resource. That is, as described above, a network event from or associated with one of the network resources can be detected by an enabler associated with that resource, a driver or adapter associated with that resource, or by another means.

The first network event can be handled 510 with an enabler associated with the first network resource. The enabler associated with the first network resource can control behavior of the first network resource. That is, as described above, the network events can be handled by high-performance network components, including the enabler, to reduce the latencies apparent to the end users.

Behavior of the first network resource can be orchestrated 515 by applying orchestration to the enabler associated with the first network resource. That is, orchestration of the component can be performed through the enabler rather than directly on the network component. Thus, the high-performance network components are able to handle the network events without incurring latencies introduced by the orchestration while orchestration of the actions and interactions of the components can be orchestrated via the enablers of each component. As described above, applying orchestration to the enabler associated with the first network resource can comprise performing one or more processes based on the first network event. For example, the one or more processes can be defined in Business Process Execution Language (BPEL).

It should be noted that the process may be applied to more than one network event and/or resource. That is, the method can also include detecting 505 a second network event related to a second network resource. The second network event can be handled 510 with an enabler associated with the second network resource. The enabler associated with the second network resource can control behavior of the second network resource. Behavior of the second network resource can be orchestrated 515 by applying orchestration to the enabler associated with the second network resource. Applying orchestration to the enabler associated with the second network resource can comprise performing one or more processes based on the second network event. For example, the one or more processes can be defined in BPEL.

Furthermore, as noted above, when more than one network event is detected, orchestrating behavior of the first network resource and orchestrating behavior of the second network resource can comprise orchestrating interactions between the enabler associated with the first network resource and the enabler associated with the second network resource. That is, the interactions of the network resources can be orchestrated via their associated enablers. Orchestrating interactions between the enabler associated with the first network resource and the enabler associated with the second network resource comprises performing one or more processes based on the first network event and the second network event. For example, the one or more processes can be defined in BPEL. In one embodiment, at least one of the enabler associated with the first network resource and the enabler associated with the second network resource can comprise a call control enabler.

Figure 6:
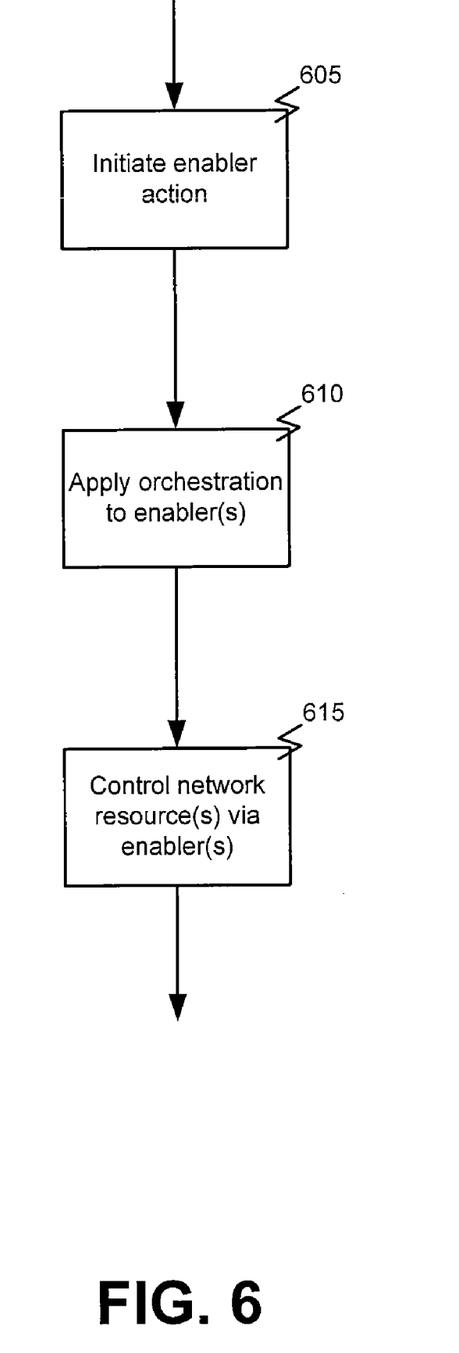
FIG. 6 is a flowchart illustrating a process for orchestrating behavior of network resources while reducing latency according to another embodiment of the present invention.

FIG. 6 is a flowchart illustrating a process for orchestrating behavior of network resources while reducing latency according to another embodiment of the present invention. In this example, the first enabler can be adapted to initiate 605 a network action and control the first network resource according to the network action and the network resource can be adapted to perform network signaling and transport processes according to the network action. The orchestrator can be adapted to orchestrate 610 the behavior of the first network resource by applying orchestration to the first enabler based on the network action. In some cases, the first network enabler can be adapted to initiate the network action in response to orchestration performed by the orchestrator.

Behavior of the first network resource can be controlled 615 by applying orchestration to the enabler associated with the first network resource. That is, orchestration of the component can be performed through the enabler rather than directly on the network component. Thus, the high-performance network components are able to handle the network events without incurring latencies introduced by the orchestration while orchestration of the actions and interactions of the components can be orchestrated via the enablers of each component. As described above, applying orchestration to the enabler associated with the first network resource can comprise performing one or more processes based on the first network event. For example, the one or more processes can be defined in Business Process Execution Language (BPEL).

Figure 7:
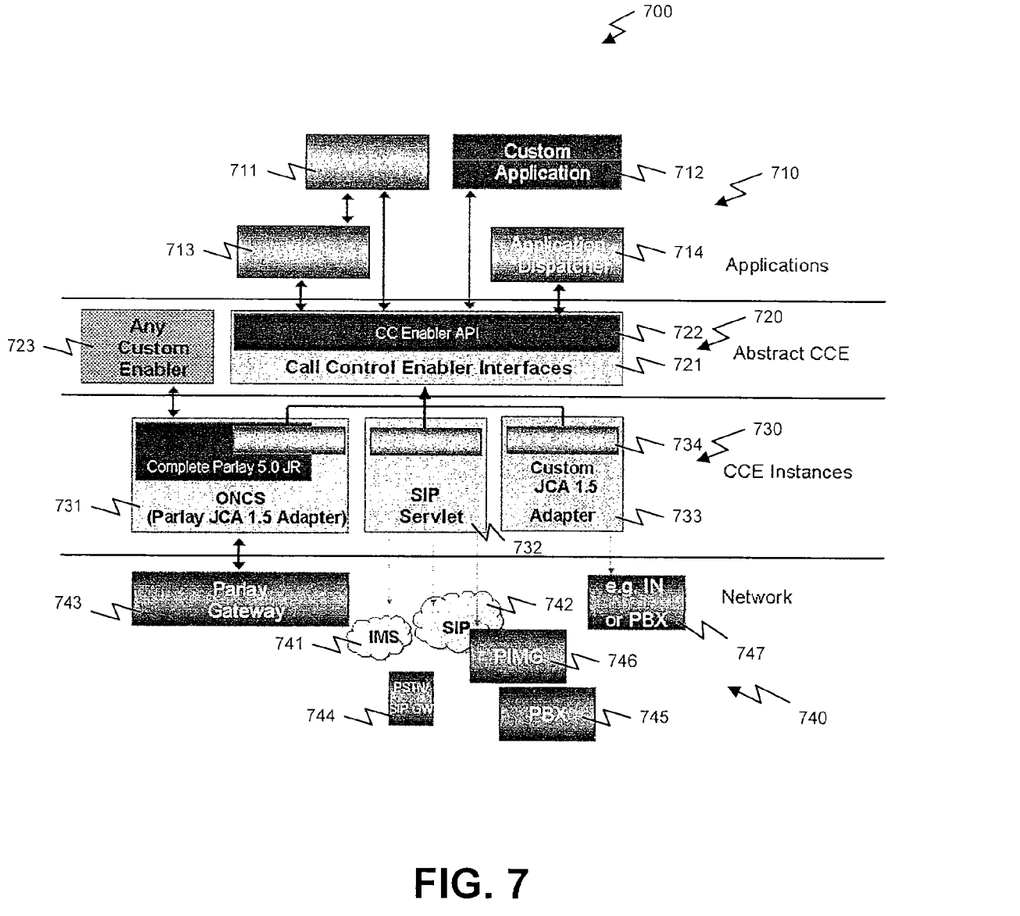
FIG. 7 is a block diagram illustrating use of exemplary call control enablers according to one embodiment of the present invention.

FIG. 7 is a block diagram illustrating use of exemplary call control enablers according to one embodiment of the present invention. In this example, the implementation is divided into a number of logical layers including, but not limited to, a layer of applications 710, a layer comprising one or more abstract call control enablers 720, a layer comprising specific call control enabler instances 730 or implementations, and a network layer 740. Generally speaking, the application layer 710 can comprise any of a number of specific applications that may interface and/or interact with the call control enablers 720 and 730. For example, the applications can include, but are not limited to, a web service 713, a Virtual Public Branch eXchange (VPBX) applications, any number of custom applications 712, an application dispatcher 714, etc.

The abstract call control enabler layer 720 can include, but is not limited to, any of a number of custom enablers 723 and one or more call control enabler interfaces 721. Generally speaking, the call control enabler interfaces 721 can provide high-level Application Program Interfaces (APIs) 722. Via the APIs 722, applications 710 can call or invoke various functions or features of the call control enabler. For example, the APIs 722 provided by the abstract call control enabler layer 720 can include, but is not limited to, APIs for call creation, call forwarding and/or redirection, call handling and conferencing, call notifications, etc. Upon invocation by an application 710 via the API 722, one or more instances of the call control enabler may be instantiated. That is, one or more call control enabler instances can be created for specific call control enabler implementations based on the request from the applications 710 via the API 722.

The individual call control enabler instances 730 can be implemented in many ways to perform various functions and provide adapters to network resources. For example, the call control enabler instances 730 can include a instances 731 for interfacing or adapting to Parlay based resources. Such instances can provide, for example, Java Cryptography Architecture (JCA) adapters to a Parlay gateway (GW) 743 JCA adapters to IN GW or PBX 747, and/or JCA adapter 733 to anything else that does call control/routing. In another example, the call control enabler instances 730 can include a Session Initiation Protocol (SIP) servlet providing an interface to IP Multimedia Subsystem (IMS) 741, SIP internet, or other SIP deployments. In such cases, SIP may be driving a PBX-IP Media Gateway (PIMG) 746 to drive PBXs 745, a SIP to PSTN GW 744, or others connected with a SIP network 742.

Therefore, the call control enabler, or another enabler as described above, can rely on gateways and network resources designed to provide high performance, i.e., operate with low, predictable latency, at the level of the network. These components can be the first to respond to network events or network instructions and act on them. Adapters can be implemented in ways that provide the best possible predictable low latencies. These adapters can have latencies higher that the network resources can be implemented with techniques to handle messages without delays caused by unnecessary lookup of target, instantiation of targets and other messaging hurdles.

In other words, higher levels of the implementation incur higher delays due to higher latencies, i.e., the latencies are staged or layered. However, lower layers implement most of the interactions. For example, the network resources handle the network signalling and transport issues while the adapters react to events and signalling aspects. The application or orchestration layer can the deal with a smaller set of abstracted events that include events upon which application logic or configuration decisions should be applied.

Figure 8:
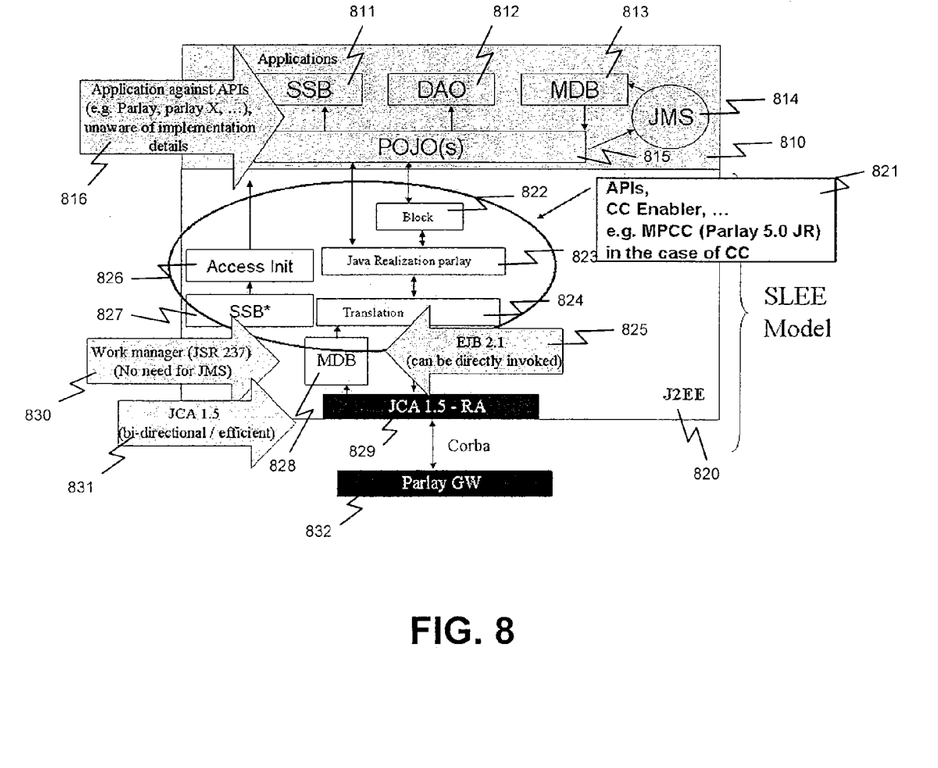
FIG. 8 is a block diagram illustrating additional details of an exemplary implementation of a call control enabler according to one embodiment of the present invention.

FIG. 8 is a block diagram illustrating additional details of an exemplary implementation of a call control enabler according to one embodiment of the present invention. This example includes an application layer 810 and a call control enabler layer 820 which may be, as indicated in this example, implemented in Java. The application layer can include, but is not limited to Data Access Objects (DAO) 812, a Java Message Service (JMS) 814, Plain Old Java Objects POJO(s) 815, Stateful Session Bean (SSB), and/or Message Driven Bean (MDB). These applications 810 can be called, invoked, instantiated, or otherwise initiated 816, for example via an API, from other applications requesting call control.

As noted above, the call control enabler 820 can provide an API 821 for interfacing with the applications 810. The call control enabler can include, for example, a block module 822, an access initialization module 826, a Java Realization parlay module 823, an SSB module, a translation module 824, and an MDB module 828. Additionally, the call control enabler 820 can include a JCAA module for interfacing with a Parlay Gateway 832 or other Parlay based network resource.

Events can be marshalled with minimum instantiation and while avoiding lookup with target MDB. For example, EJB 2.1 can be directly invoked 825 and the work manager allows that while avoiding lookups. Additionally or alternatively, bi-directional adapters 830, and 831 can be built in J2EE to implement the adapters of enablers to network resources.

Figure 9:
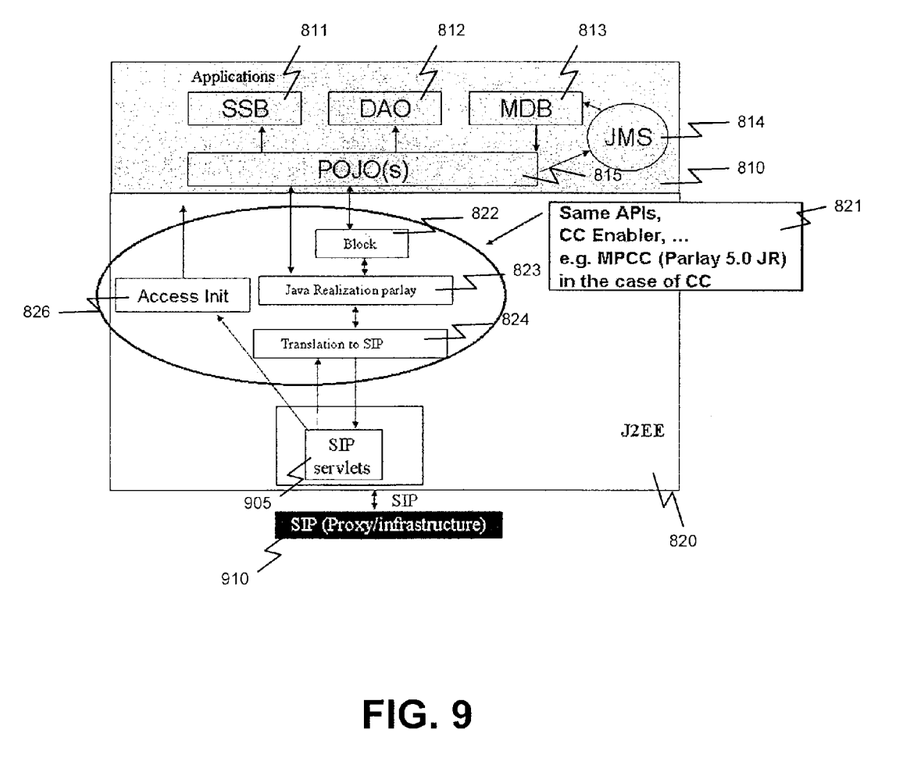
FIG. 9 is a block diagram illustrating additional details of another exemplary call control enabler according to one embodiment of the present invention.

FIG. 9 is a block diagram illustrating additional details of another exemplary call control enabler according to one embodiment of the present invention. This example illustrates the application 810 and call control enabler 820 as described above. However, in this example, the call control enabler 820 implements one or more SIP servlets 905 for interacting with a SIP proxy or other SIP infrastructure 910 through which the call control enabler may communicate.

In the foregoing description, for the purposes of illustration, methods were described in a particular order. It should be appreciated that in alternate embodiments, the methods may be performed in a different order than that described. Additionally, the methods may contain additional or fewer steps than described above. It should also be appreciated that the methods described above may be performed by hardware components or may be embodied in sequences of machine-executable instructions, which may be used to cause a machine, such as a general-purpose or special-purpose processor or logic circuits programmed with the instructions, to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A system comprising:
a communications network;
a first network resource communicatively coupled with the communications network, the first network resource comprising one or more components, each component of the first network resource having predictable latencies and adapted to handle network signaling and transport processes;
a first enabler communicatively coupled with the first network resource, the first enabler comprising one or more components, each component of the first enabler individually having greater latencies than each of the individual components of the first network resource and adapted to control the first network resource;
an adapter communicatively coupled with the first network resource and the first enabler, the adapter comprising one or more components, each component of the adapter individually having greater latencies than each of the individual components of the first network resource and lower latencies than each of the individual components of the first enabler and adapted to react to network events and signaling of the communications network not handled by the resource; and
an orchestrator communicatively coupled with the first enabler and adapted to orchestrate behavior of the first network resource via the first enabler,
wherein the orchestrator applies a set of rules or performs one or more predefined processes for a particular network event where application logic or configuration decisions are applied.

2. The system of claim 1, wherein the one or more processes are defined in Business Process Execution Language (BPEL).

3. The system of claim 1, wherein the first network resource is adapted to detect a first network event and handle network signaling and transport processes related to the first network event, wherein the first network enabler is adapted to control the first network resource based on the first network event, and wherein the orchestrator is adapted to orchestrate behavior of the first network resource by applying orchestration to the first enabler based on the first network event.

4. The system of claim 1, wherein the first enabler is adapted to initiate a network action and control the first network resource according to the network action and wherein the network resource is adapted to perform network signaling and transport processes according to the network action.

5. The system of claim 4, wherein the orchestrator is adapted to orchestrate the behavior of the first network resource by applying orchestration to the first enabler based on the network action.

6. The system of claim 4, wherein the first network enabler is adapted to initiate the network action in response to orchestration performed by the orchestrator.

7. The system of claim 1, further comprising:
a second network resource communicatively coupled with the communications network, the second network resource comprising one or more components, each component of the second network resource having predictable latencies and adapted to handle network signaling and transport processes;
a second enabler communicatively coupled with the second network resource, the second enabler comprising one or more components each component of the second enabler individually having greater latencies than each of the individual components of the second network resource and adapted to control the second network resource; and
wherein the orchestrator is communicatively coupled with the second enabler and is further adapted to orchestrate behavior of the second network resource via the second enabler.

8. The system of claim 7, wherein the orchestrator is adapted to apply orchestration to the second enabler by performing one or more processes based on the second network event.

9. The system of claim 8, wherein the one or more processes are defined in BPEL.

10. The system of claim 8, wherein the orchestrator is further adapted to orchestrate interactions between the first enabler and the second enabler.

11. The system of claim 10, wherein the orchestrator is adapted to orchestrate interactions between the first enabler and the second enabler by performing one or more processes based on the first network event and the second network event.

12. The system of claim 11, wherein the one or more processes are defined in BPEL.

13. The system of claim 7, wherein at least one of the first enabler and the second enabler comprises a call control enabler.

14. A method for orchestrating behavior of network resources while reducing latency in handling network events, the method comprising:
    detecting a network event or action;
    handling network signaling and transport processes related to the network event or action with a first network resource having one or more components, each of the components of the first network resource having predictable latencies;
    controlling the first network resource with a first enabler having one or more components, each of the components of the first enabler individually having greater latencies than each of the individual components of the first network resource;
    reacting to network events and signaling not handled by the network resource with an adapter having one or more components, each of the components of the adapter individually having greater latencies than each of the individual components of the first network resource and lower latencies than each of the individual components of the first enabler and wherein reacting to network events and signaling not handled by the network resource comprises handling fewer interactions with the adapter than with the network resource; and
    orchestrating behavior of the first network resource via the first enabler with an orchestrator, wherein the orchestrator applies a set of rules or performs one or more predefined processes for a particular network event where application logic or configuration decisions are applied.

15. The method of claim 14, wherein the one or more processes are defined in Business Process Execution Language (BPEL).

16. The method of claim 14, wherein detecting the network event or action is performed by the network resource, wherein the first network enabler controls the first network resource based on the first network event, and wherein the orchestrator orchestrates behavior of the first network resource based on the first network event.

17. The method of claim 14, wherein the network event or action is initiated by the first enabler, wherein the first enabler controls the first network resource according to the network action, and wherein the network resource performs network signaling and transport processes according to the network action.

18. The method of claim 17, wherein the orchestrator orchestrates the behavior of the first network resource based on the network action.

19. The method of claim 17, wherein the first network enabler initiates the network action in response to orchestration performed by the orchestrator.

20. A machine-readable memory having stored thereon a series of instructions which, when executed by a processor, cause the processor to orchestrate behavior of network resources while reducing latency in handling network events by:
    detecting a network event or action;
    handling network signaling and transport processes related to the network event or action with a first network resource having one or more components, each of the components of the first network resource having predictable latencies;
    controlling the first network resource with a first enabler having one or more components, each of the components of the first enabler individually having greater latencies than each of the individual components of the first network resource;
    reacting to network events and signaling not handled by the network resource with an adapter having one or more components, each of the components of the adapter individually having greater latencies than each of the individual components of the first network resource and lower latencies than each of the individual components of the first enabler and wherein reacting to network events and signaling not handled by the network resource comprises handling fewer interactions with the adapter than with the network resource; and
    orchestrating behavior of the first network resource via the first enabler with an orchestrator, wherein the orchestrator applies a set of rules or performs one or more predefined processes for a particular network event where application logic or configuration decisions are applied.

21. The machine-readable memory of claim 20, wherein the one or more processes are defined in Business Process Execution Language (BPEL).

22. The machine-readable memory of claim 20, wherein detecting the network event or action is performed by the network resource, wherein the first network enabler controls the first network resource based on the first network event, and wherein the orchestrator orchestrates behavior of the first network resource based on the first network event.

23. The machine-readable memory of claim 20, wherein the network event or action is initiated by the first enabler, wherein the first enabler controls the first network resource according to the network action, and wherein the network resource performs network signaling and transport processes according to the network action.

24. The machine-readable memory of claim 23, wherein the orchestrator orchestrates the behavior of the first network resource based on the network action.

25. The machine-readable memory of claim 23, wherein the first network enabler initiates the network action in response to orchestration performed by the orchestrator.

26. The system of claim 1, wherein reacting to network events and signaling not handled by the network resource comprises handling fewer interactions with the adapter than with the network resource.

27. The system of claim 26, wherein the one or more processes handle fewer interactions than the adapter.

* * * * *

UNITED STATES PATENT AND TRADEMARK OFFICE
CERTIFICATE OF CORRECTION

PATENT NO.       : 8,095,688 B2
APPLICATION NO.  : 11/670150
DATED            : January 10, 2012
INVENTOR(S)      : Maes It is certified that error appears in the above-identified patent and that said Letters Patent is hereby corrected as shown below:

In column 1, line 14, delete "casers," and insert -- cases, --, therefor.

In column 5, line 8, after "network" delete "may".

Signed and Sealed this
Third Day of April, 2012

David J. Kappos
*Director of the United States Patent and Trademark Office*